Patented Aug. 28, 1945

2,383,769

UNITED STATES PATENT OFFICE 2,383,769

METHOD OF TREATING ASPHALT

Solomon Caplan, New York, N. Y., assignor to Harvel Research Corporation, a corporation of New Jersey No Drawing. Application April 3, 1941, Serial No. 386,747

6 Claims. (Cl. 196—22)

The present invention relates to methods and steps for treating asphalt whereby its nature is modified to the extent that its melting point is appreciably higher than the melting point of the asphalt which was the starting material, and the present invention also relates to the products obtained by the methods and steps of the present invention.

By the term asphalt, as used herein, is meant natural asphalt and petroleum pitch, both having high sulphuric acid residues, that is to say, they both are comparatively free from oxygenated bodies.

The following definitions are used for defining the starting materials for the practice of the present invention and are taken from "Asphalts and Allied Substances," by H. Abraham, 1920, D. Van Nostrand Company, New York, N. Y., pages 23 and 268, respectively:

*Asphalt.*—A term applied to a species of bitumen, also to certain pyrogenous substances of dark color, variable hardness, comparatively non-volatile; composed of hydrocarbons, substantially free from oxygenated bodies; containing relatively little to no crystallizable paraffines; sometimes associated with mineral matter, the non-mineral constituents being fusible, and largely soluble in carbon disulphide; and whose distillate fractioned between 300 and 350° C., yields considerable sulphonation residue.

*Residual asphalt.*—This is applied to the residues obtained from the steam or dry distillation of mixed petroleums and the steam distillation of asphalt-bearing petroleum. It is characterized by being semi-solid to solid at room temperature.

Illustrative examples of the method and products of the present invention are as follows:

*Example 1.*—A quantity of asphalt having a ball and ring melting point of 72° C. was mixed with 5% of its weight in diethyl sulphate and the temperature brought up to about 200° C. and held at that temperature for about one-half hour when it was allowed to cool. The cooled product had a ball and ring melting point of 89° C.

The 89° C. ball and ring M. P. product together with the diethyl sulphate contained therein, was put in an oven at 110° C. for sixteen hours, after which another melting point (ball and ring) was run on it. This melting point was found to be 95° C.

A check was run by putting a sample of the asphalt starting material, without diethyl sulphate, in an oven at 200° C. for one-half hour and then at 110° C. for sixteen hours, taking a check sample out after the 200° C. heating melting points were run for both steps and found to be 72° C. in both cases, showing that no change was brought about by heat alone at the stated temperatures.

*Example 2.*—A quantity of asphalt, which is a powder at room temperature, was mixed with about eight per cent of its weight of diethyl sulphate and heated up to about 150° C. for about three hours. The melting point was materially increased.

*Example 3.*—A quantity of 72° C. ball and ring melting point asphalt was mixed with about 10% of its weight of diethyl sulphate and heated up to about 200° C. for about one-half hour after which it was put in an oven at 110° C. for about sixteen hours. After the 200° C. heating the ball and ring melting point had been raised to 127° C. and after the succeeding 110° C. heating the ball and ring melting point was found to be 132° C.

*General examples.*—Various substitutes or equivalents for the diethyl sulphate can be used in the examples given above, for example, dimethyl sulphate and dipropyl sulphate and other equivalent dialkyl sulphates, and the quantities used are from about 1% to about 10% of the weight of the asphalt being treated. The asphalts polymerized by the method of the present invention can be stated to be those having ball and ring melting points upwardly from about 55° C.

Having thus described my invention, what I claim and desire to protect by Letters Patent is:

1. The method of raising the melting point of asphalt which comprises heating asphalt with from 1% to about 10% of its weight of a lower dialkyl sulfate at temperatures from about 150° C. to about 200° C. until the melting point is increased at least 17° C.

2. The method of raising the melting point of asphalt which comprises heating asphalt with from 1% to about 10% of its weight of a lower dialkyl sulfate to a temperature between about 150° C. and about 200° C. until the melting point is increased at least 17° C. and subsequently holding at a temperature of about 110° C. until the melting point is increased at least an additional 5° C.

3. The method of claim 1 in which the dialkyl sulfate is diethyl sulfate.

4. The method of claim 2 in which the dialkyl sulfate is diethyl sulfate.

5. The method of claim 2 in which the asphalt initially has a ball-and-ring softening point greater than about 55° C.

6. The method of claim 2 in which the asphalt initially has a ball-and-ring softening point greater than about 55° C.

SOLOMON CAPLAN.